(12) United States Patent
Liu et al.

(10) Patent No.: US 9,609,661 B2
(45) Date of Patent: Mar. 28, 2017

(54) WIRELESS COMMUNICATION DEVICE, WIRELESS COMMUNICATION SYSTEM, AND WIRELESS COMMUNICATION METHOD

(71) Applicant: Panasonic Corporation, Osaka (JP)

(72) Inventors: Weijie Liu, Kanagawa (JP); Ken Naka, Tokyo (JP)

(73) Assignee: Panasonic Corporation, Osaka (JP)

( * ) Notice: Subject to any disclaimer, the term of this patent is extended or adjusted under 35 U.S.C. 154(b) by 65 days.

(21) Appl. No.: 14/432,803

(22) PCT Filed: Jul. 4, 2014

(86) PCT No.: PCT/JP2014/003562
§ 371 (c)(1),
(2) Date: Apr. 1, 2015

(87) PCT Pub. No.: WO2015/025453
PCT Pub. Date: Feb. 26, 2015

(65) Prior Publication Data
US 2015/0282203 A1    Oct. 1, 2015

(30) Foreign Application Priority Data

Aug. 22, 2013  (JP) .................................. 2013-172149

(51) Int. Cl.
*H04W 72/12*   (2009.01)
*H04L 29/06*   (2006.01)
(Continued)

(52) U.S. Cl.
CPC ....... *H04W 72/1263* (2013.01); *H04L 49/205* (2013.01); *H04L 65/80* (2013.01);
(Continued)

(58) Field of Classification Search
CPC ................. H04L 1/0003; H04L 1/0005; H04L 29/08954; H04L 65/332; H04L 65/80;
(Continued)

(56) References Cited

U.S. PATENT DOCUMENTS

2006/0052088 A1   3/2006   Pavon et al.
2008/0002692 A1*  1/2008   Meylan ............... H04W 72/005
                                                  370/390
(Continued)

FOREIGN PATENT DOCUMENTS

JP      2006-503519        1/2006

OTHER PUBLICATIONS

T. Slaen, Classifying Rate Adaptation Algorithms in IEEE 802.11b/g/n Wireless Networks, Aug. 23, 2012.*
(Continued)

*Primary Examiner* — Christopher Crutchfield
(74) *Attorney, Agent, or Firm* — Seed IP Law Group LLP

(57) ABSTRACT

There is provided a wireless communication device that may prevent a degradation of QoS of communications caused by a schedule change. A wireless communication device in a wireless communication system that transits and receives a traffic stream using a millimeter wave includes a schedule generator, a transmitter, and a receiver, the schedule generator generating a schedule for at least one wireless station, which communicates with the wireless communication device, to transmit a plurality of traffic streams, the transmitter transmitting the generated schedule to the wireless station using a broadcast frame, the receiver receiving QoS requests transmitted by the respective wireless stations, each of the QoS requests including a current MCS index and a range of available MCS indexes for transmitting a traffic stream. In accordance with the QoS requests received by the receiver the schedule generator sets a period for periodically
(Continued)

allocating respective transmission time periods of the plurality of traffic streams, and generates a schedule in which, in each period, an interval is provided between transmission time periods of the plurality of traffic streams, the transmission time periods being next to each other.

8 Claims, 12 Drawing Sheets

(51) Int. Cl.
    *H04L 12/931*     (2013.01)
    *H04W 28/24*     (2009.01)

(52) U.S. Cl.
    CPC ....... *H04W 72/12* (2013.01); *H04W 72/1231* (2013.01); *H04W 72/1236* (2013.01); *H04W 72/1278* (2013.01); *H04W 72/1284* (2013.01); *H04W 28/24* (2013.01)

(58) Field of Classification Search
    CPC .... H04L 9/2054; H04L 49/205; H04W 72/12; H04W 72/1278; H04W 72/1284; H04W 72/1289; H04W 72/1294
    See application file for complete search history.

(56) References Cited

U.S. PATENT DOCUMENTS

2009/0323608 A1* 12/2009 Adachi ................. H04W 48/18
    370/329
2010/0157961 A1* 6/2010 Ji ....................... H04W 72/1257
    370/338

OTHER PUBLICATIONS

Author Unknown, IEEE 802.11e-2005, pp. 1-211, Nov. 11, 2005.*
International Search Report of PCT application No. PCT/JP2014/003562 dated Aug. 26, 2014.
IEEE Computer Society "Part11: Wireless LAN Medium Access Control (MAC) and Physical Layer (PHY) Specifications Amendment3: Enhancements for Very High Throughput in the 60 GHz Band" IEEE Std 802. 11ad, Dec. 28, 2012.

* cited by examiner

FIG. 3

| MCS INDEX | TRANSMISSION SPEED (Mbps) |
|---|---|
| 1 | 385 |
| 2 | 770 |
| 3 | 962.5 |
| 4 | 1155 |
| 5 | 1251.25 |
| 6 | 1540 |
| 7 | 1925 |
| 8 | 2310 |
| 9 | 2502.5 |

FIG. 4A

| Element ID | Length | DMG Allocation Info | BF Control | Allocation Period | Minimum Allocation | Maximum Allocation | Minimum Duration | Number of Constraints | TSCONST |

FIG. 4B

| Present MCS | Minimum MCS | Maximum MCS |

WIRELESS COMMUNICATION DEVICE, WIRELESS COMMUNICATION SYSTEM, AND WIRELESS COMMUNICATION METHOD

TECHNICAL FIELD

The present disclosure relates to a wireless communication device, a wireless communication system, and a wireless communication method that perform communication using a millimeter wave.

BACKGROUND ART

In a wireless communication network, scheduling is an effective way to improve the quality of service (QoS: Quality of Service) of communications. "Scheduling" refers to scheduling of a transmission time to which data to be transmitted from a wireless station to a base station should be allocated, and the scheduling is performed by a base station. Here, a base station is an AP (access point) in the case of microwave communications, and a PCP (Personal basic service set Control Point) in the case of millimeter-wave communications. Then, when receiving a transmission request from a wireless station (STA), an access point or a PCP schedules a dedicated transmission time period for a specified traffic stream, which is data to be transmitted by the wireless station. Note that, in the following description, scheduling of a dedicated transmission time period is also called "bandwidth allocation". Since we can avoid contention that may occur when a wireless channel, or in other words, a wireless communication resource is accessed, utilization ratio of the wireless channel is increased by performing scheduling. An access point or a PCP broadcasts a "schedule", which is a result of scheduling, to all wireless stations using a beacon frame. Each wireless station transmits the specified traffic stream in accordance with the broadcast schedule.

In the case where a wireless channel is used for transmission of a traffic stream having a real-time requirement, such as video streaming, efficient bandwidth allocation through advanced scheduling is desired. For example, in order to ensure the real-time requirement, it is necessary to periodically allocate transmission time periods to a wireless channel. In addition, in order to transmit all data inputted in each period, it is necessary to calculate, for each traffic stream, a transmission time period to be allocated to the traffic stream in accordance with the amount of data of the traffic stream. PTL 1 discloses a scheduling method for a plurality of traffic streams having real-time requirements in microwave communications based on, for example, IEEE Std 802.11e. In the scheduling method described in PTL 1, the same interval (so-called "service interval: Service Interval (SI)") is allocated to a plurality of traffic streams. Such a method is effective in microwave communications.

CITATION LIST

Patent Literature

PTL 1: Japanese Unexamined Patent Application Publication (Translation of PCT Application) No. 2006-503519
Non Patent Literature
NPL 1: "IEEE Std 802.11ad-2012", IEEE, Dec. 28, 2012

SUMMARY OF INVENTION

However, in the case where the scheduling method of PTL 1 is applied to millimeter-wave communications based on specifications described in NPL 1 or the like, since there may be the case where a schedule has to be promptly changed, the QoS of communications may be degraded.

The present disclosure has been made in light of the above-described circumstances and provides, in a wireless communication system that transmits and receives traffic streams using a millimeter wave, a wireless communication device, a wireless communication system, and a wireless communication method that may prevent a degradation of QoS of communications caused by a schedule change.

A wireless communication device according to an aspect of the present disclosure includes a receiver that receives QoS requests, each of the QoS requests including a current MCS index and a range of available MCS indexes, from a wireless station, a schedule generator that, in accordance with the QoS requests received by the receiver, sets a period for periodically allocating respective transmission time periods of a plurality of traffic streams, provides an interval between transmission time periods that are next to each other in each period, and generates a schedule for the wireless station to transmit the plurality of traffic streams, and a transmitter that transmits the schedule generated by the schedule generator using a broadcast frame.

A wireless communication device according to the present disclosure is a wireless communication device in a wireless communication system that transmits and receives traffic streams using a millimeter wave. The wireless communication device includes a receiver that receives QoS requests respectively transmitted by wireless stations, each of the QoS requests including a current MCS index and a range of available MCS indexes of a corresponding one of the wireless stations, a schedule generator that, in accordance with the QoS requests received by the receiver, sets a period for periodically allocating respective transmission time periods of a plurality of traffic streams that are to be transmitted by at least one wireless station that communicates with the wireless communication device, provides an interval between transmission time periods that are next to each other in each period, and generates a schedule for the at least one wireless station to transmit the plurality of traffic streams, and a transmitter that transmits the schedule generated by the schedule generator to the at least one wireless station using a broadcast frame.

A wireless communication system according to the present disclosure is a wireless communication system that transmits and receives traffic streams using a millimeter wave. The wireless communication system includes at least one wireless station that transmits a traffic stream and a QoS request including a current MCS index and a range of available MCS indexes for transmitting the traffic stream, and a wireless communication device that performs scheduling for the at least one wireless station to transmit the traffic stream. The wireless communication device includes a schedule generator that generates a schedule for the at least one wireless station to transmit a plurality of traffic streams, a transmitter that transmits the schedule generated by the schedule generator to the at least one wireless station using a broadcast frame, and a receiver that receives traffic streams and QoS requests transmitted by the at least one wireless station. The schedule generator sets, in accordance with the QoS requests received by the receiver, a period for periodically allocating respective transmission time periods of the plurality of traffic streams, provides an interval between transmission time periods that are next to each other in each period, and generates the schedule for the at least one wireless station to transmit the plurality of traffic streams.

A wireless communication method according to the present disclosure is a wireless communication method for a wireless communication system including at least one wireless station that transmits, using a millimeter wave, a traffic stream and a QoS request including a current MCS index and a range of available MCS indexes for transmitting the traffic stream, and a wireless communication device that performs scheduling for the wireless station to transmit the traffic stream, the wireless communication method being to be performed by the wireless communication device. The wireless communication method includes: receiving QoS requests respectively transmitted by wireless stations, each of the QoS requests including a current MCS index and a range of available MCS indexes for transmitting a traffic stream, setting, in accordance with the QoS requests received in the receiving step, a period for periodically allocating transmission time periods of a plurality of traffic streams that are to be transmitted by the at least one wireless station, providing an interval between transmission time periods that are next to each other in each period, and generating a schedule for the at least one wireless station to transmit the plurality of traffic streams, and transmitting the schedule generated in the schedule generating step to the at least one wireless station using a broadcast frame. Note that these collective or specific aspects may also be realized by a system, a method, an integrated circuit, or a computer program, and may also be realized by an arbitrary combination of systems, devices, methods, integrated circuits and recording mediums.

According to a wireless communication device, a wireless communication system, and a wireless communication method according to the present disclosure, a degradation of QoS of communications caused by a schedule change may be prevented in a wireless communication system that transmits and receives traffic streams using a millimeter wave.

BRIEF DESCRIPTION OF DRAWINGS

FIG. 3 is a diagram illustrating a correspondence between an MCS value and a transmission speed for IEEE Std 802.11ad.

FIG. 4A is a diagram illustrating fields associated with a DMG TSPEC element.

FIG. 4B is a diagram illustrating fields to be added.

FIG. 7 is a diagram for describing what four fields associated with a bandwidth refer to.

DESCRIPTION OF EMBODIMENTS (Underlying Knowledge Forming Basis of the Present Disclosure)

The quality of communications in millimeter-wave communications highly depends on a communication distance. That is, a change in communication distance greatly affects the quality of communications. Thus, it is highly likely that the MCS (Modulation and Coding Scheme) used is changed frequently in accordance with a change in communication distance. Since modulation schemes and coding schemes are changed when MCS is changed, transmission speeds and thus transmission time periods necessary for transmission get changed. Thus, in order to ensure the QoS of millimeter-wave communications, there may be the case where a schedule planned by a PCP has to be promptly changed.

Figure 13A:
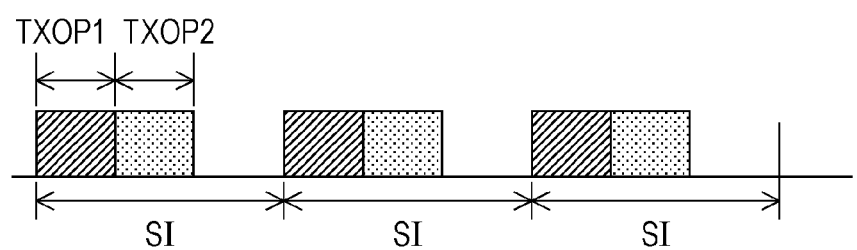
FIG. 13A is a diagram illustrating an initial schedule created by a PCP or an AP.
Figure 13B:
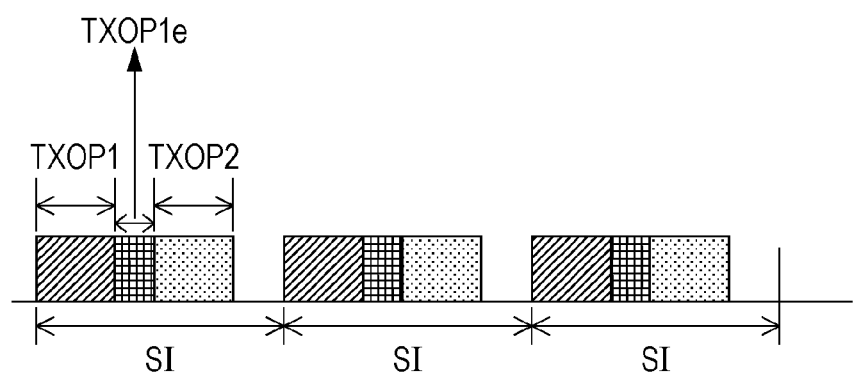
FIG. 13B is a diagram illustrating a schedule in which a service time period allocated to the first traffic stream has been extended.

In an example illustrated in of FIGS. 13A 13B, the same service interval (SI) is allocated to two traffic streams in accordance with the scheduling method described in PTL 1. In addition, for each traffic stream, a service time period (TXOP (Transmission Opportunity)) is allocated to the traffic stream, the service time period being determined by dividing the amount of input data from an application in each period by the transmission speed for the data. FIG. 13A is a diagram illustrating an initial schedule created by a PCP. In the initial schedule, a service time period TXOP1 is allocated to a first traffic stream and a service time period TXOP2 is allocated to a second traffic stream. However, when MCS is changed, there may be the case where the service time period allocated to the first traffic stream has to be extended to "TXOP1+TXOP1e" as illustrated in FIG. 13B.

In the case of microwave communications, an access point may broadcast a changed schedule in the following beacon period. However, since a technology called "Pseudo-Static bandwidth" is used in millimeter-wave communications, a certain time period (for example, a few beacon periods) is necessary before it is possible for a PCP to broadcast a changed schedule. That is, in the case of millimeter-wave communications, even when a request is issued for changing a schedule as illustrated in FIG. 13A to a schedule as illustrated in of FIG. 13B, the schedule illustrated in FIG. 13A has to be used for a few beacon periods as it is until the schedule is actually changed.

However, until the schedule is actually changed, a bandwidth narrower than necessary, in other words, a transmission time period shorter than necessary can be acquired. Thus, QoS with millimeter-wave communications decreases. The applicants have done a study diligently in light of the above-described circumstances and, as a result, have found out that, according to the following embodiments, a degradation of QoS of communications caused by a schedule change may be prevented.

In the following, embodiments of the present disclosure will be described with reference to the drawings. Note that, in the following embodiments, a wireless communication system based on IEEE Std 802.11ad or the like and using a millimeter wave will be described as an example. Note that the content of the present disclosure is not only applicable to a wireless communication system using a millimeter wave but also to a wireless communication system using a microwave.

First Embodiment

Figure 1A:
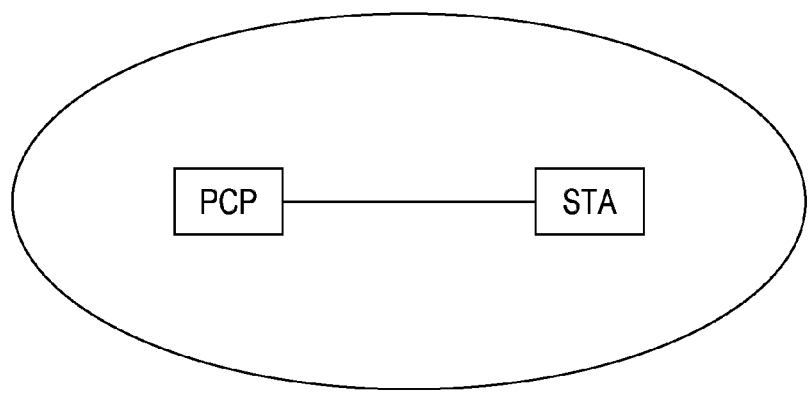
FIG. 1A is a diagram illustrating a wireless communication system including one PCP and one wireless station (STA).
Figure 1B:
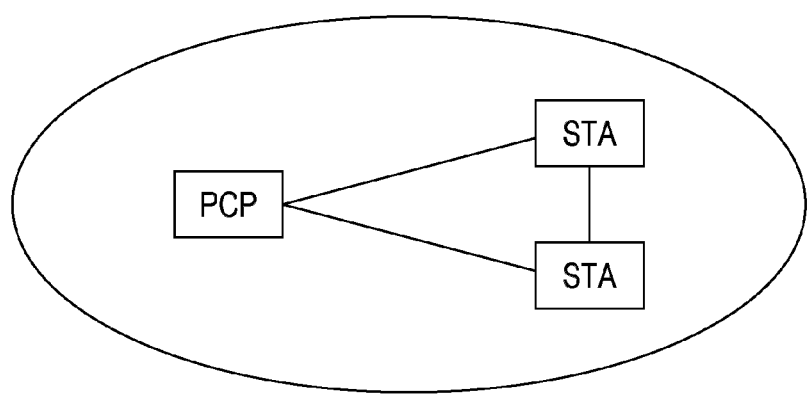
FIG. 1B is a diagram illustrating a wireless communication system including one PCP and two wireless stations (STA).

A wireless communication system using a millimeter wave includes, as illustrated in of FIGS. 1A and 1B, a PCP (Personal basic service set Control Point) and a wireless station (STA). A traffic stream from a wireless station (STA) to a PCP is called an upstream, a traffic stream from a PCP to a wireless station (STA) is called a downstream, and a traffic stream illustrated in FIG. 1B from one wireless station (STA) to another wireless station (STA) is called a side stream. The content of the present disclosure is applicable to any of the three kinds of streams, and especially effective in the case where there are a plurality of traffic streams.

Figure 2:
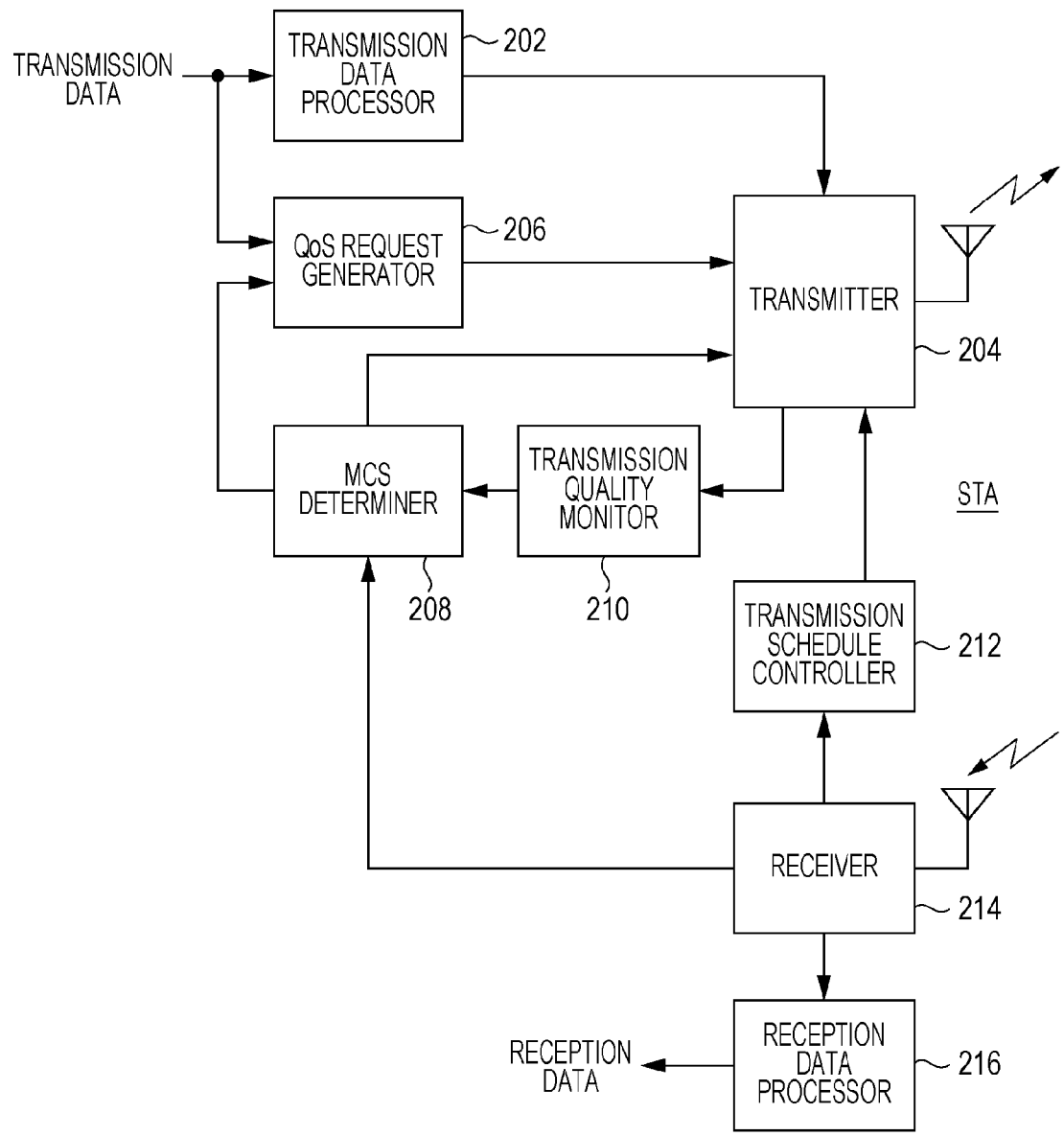
FIG. 2 is a block diagram illustrating an internal configuration of a wireless station (STA) of the first embodiment illustrated in FIGS. 1A and 1B.

FIG. 2 is a block diagram illustrating an internal configuration of a wireless station (STA) of a first embodiment illustrated in FIGS. 1A and 1B. As illustrated in FIG. 2, the wireless station (STA) includes a transmission data processor 202, a transmitter 204, a QoS request generating unit 206, a transmission quality monitor 210, an MCS determiner 208, a receiver 214, a transmission schedule controller 212, and a reception data processor 216.

The transmission data processor 202 performs a process for packaging transmission data in accordance with a specified frame format. The transmitter 204 transmits frames including control data which may contain a QoS request, and traffic streams. Note that the transmitter 204 transmits control data or traffic streams after acquiring the MCS index determined by the MCS determiner 208 and acquiring a transmission schedule from the transmission schedule controller 212. Note that the range of available MCS indexes is shared between a wireless station (STA) and a PCP.

The QoS request generating unit 206 generates a QoS request corresponding to a traffic stream for which QoS is to be requested. A QoS request created by the QoS request generating unit 206 is described in a specified frame format, and is transmitted from the transmitter 204 to the PCP. A data format in which a QoS request is described will be described later.

The transmission quality monitor 210 measures the transmission status of the transmitter 204 and calculates related statistical indexes for transmission quality evaluation. For example, the transmission quality monitor 210 measures the number of times that the transmitter 204 has retransmitted a packet, and uses a result obtained by calculating a retransmission rate for a predetermined period as an index of the transmission quality evaluation. The MCS determiner 208 acquires a result of the transmission quality evaluation from the transmission quality monitor 210, and determines an appropriate MCS (Modulation and Coding Scheme). Determination of an MCS is performed in accordance with a result of transmission quality evaluation and data characteristics such as a real time property and the like of a traffic stream transmitted by the wireless station (STA). The MCS determiner 208 sets an index indicating a determined MCS (an MCS index), in the transmitter 204 and the QoS request generating unit 206. FIG. 3 is a diagram illustrating a correspondence between an MCS index and a transmission speed for IEEE Std 802.11ad.

Furthermore, the MCS determiner 208 sets, in the QoS request generating unit 206, a current MCS index as well as an estimated minimum index (Minimum MCS) and an estimated maximum index (Maximum MCS) in the case where an MCS is changed. The range of the estimated minimum index (Minimum MCS) of MCS indexes to the estimated maximum index (Maximum MCS) of the MCS indexess is a range of available MCS indexess corresponding to a necessary transmission speed calculated in accordance with a current communication environment situation and data characteristics of a traffic stream. Usually, as an MCS index is reduced, the possibility increases that the transmission speed decreases and it is impossible to transmit all data of a traffic stream. Thus, the estimated minimum index of available MCS indexes may be determined from data characteristics of a traffic stream. In contrast, as an MCS index is increased, the transmission speed increases but a transmission distance may decrease or the amount of data packet loss may increase. Thus, the estimated maximum index of available MCS indexes may be determined in accordance with the current communication environment situation. Furthermore, in the case where the range of MCS indexes with which a schedule may be promptly changed by a PCP without a delay may be acquired from the receiver 214, the MCS determiner 208 may also determine the current MCS index within the above-described range of MCS indexes with which a schedule may be promptly changed without a delay. The above-described range of MCS indexes with which a schedule may be promptly changed without a delay is referred to as "NonPseudoStatic Minimum MCS to NonPseudoStatic Maximum MCS", which will be described later. By performing setting in this manner, a schedule change corresponding to a change in the MCS index is promptly executed without a delay.

The receiver 214 receives a beacon frame addressed to the wireless station (STA) and transmitted from the PCP or another wireless station (STA). The receiver 214 transmits, to the transmission schedule controller 212, a schedule included in a beacon frame transmitted from the PCP, and the other data to the reception data processor 216. The transmission schedule controller 212 controls a transmission time period for each traffic stream to be transmitted from the wireless station (STA), in accordance with the schedule transmitted from the receiver 214. The reception data processor 216 processes data transmitted from the receiver 214 and transmits the processed data to an upper layer of a corresponding communication protocol stack.

In the case of millimeter-wave communications based on IEEE Std 802.11ad, as a data format in which a QoS request to be transmitted from the transmitter 204 to the PCP is described, a DMG (Directional MultiGigabit) TSPEC (Traffic SPECification) element of an ADDTS (Add Traffic Stream) frame may be used. FIG. 4A illustrates fields associated with a DMG TSPEC element. In a plurality of fields illustrated in FIG. 4A, fields associated with a band request are four fields: "Allocation Period", "Minimum Allocation", "Maximum Allocation", and "Minimum Duration". "Allocation Period" indicates a period. "Minimum Allocation" refers to a necessary minimum bandwidth in each period. "Maximum Allocation" refers to a necessary maximum bandwidth in each period. "Minimum Duration" refers to the minimum duration of a bandwidth (the minimum width of one block in the case where a necessary bandwidth is divided into a plurality of blocks).

In the present embodiment, the fields of the above-described DMG TSPEC element are extended and a QoS request is described. For example, three fields "Present MCS", "Minimum MCS", and "Maximum MCS" illustrated in FIG. 4B are added to the fields illustrated in FIG. 4A. "Present MCS" refers to an MCS index that is currently being used on an STA side, "Minimum MCS" refers to an estimated minimum index of MCS indexes in the case where an MCS is changed, and "Maximum MCS" refers to an estimated maximum index of MCS indexes in the case where an MCS is changed. Note that the number of fields to be added is not limited to three. For example, two fields such as "Present MCS" and "Minimum MCS", or "Present MCS" and "Maximum MCS" may be added. Note that in the case where two fields "Present MCS" and "Minimum MCS" are added, it is possible to handle a decrease change of the MCS indexes but it is impossible to handle an increase change of the MCS indexes. In contrast, in the case where two fields "Present MCS" and "Maximum MCS" are added, it is possible to handle an increase change of the MCS indexes but it is impossible to handle a decreese change of the MCS indexes.

Figure 5:
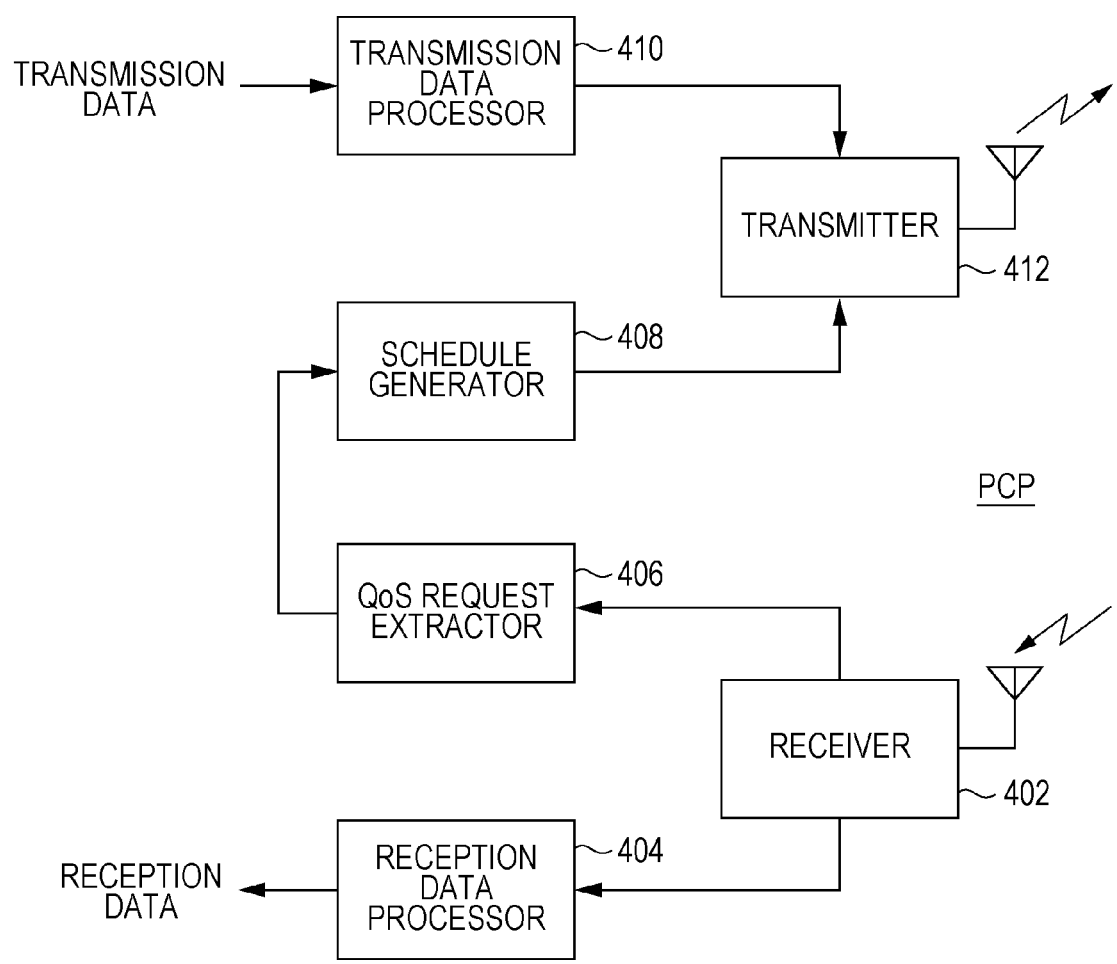
FIG. 5 is a block diagram illustrating an internal configuration of a PCP of the first embodiment illustrated in FIGS. 1A and 1B.

FIG. 5 is a block diagram illustrating an internal configuration of the PCP of the first embodiment illustrated in FIGS. 1A and 1B. As illustrated in FIG. 5, the PCP includes a receiver 402, a reception data processor 404, a QoS request extractor 406, a schedule generator 408, a transmission data processor 410, and a transmitter 412.

The receiver 402 receives data addressed to the PCP and transmitted from a wireless station (STA). The reception data processor 404 processes data received by the receiver 402 and transmits the processed data to an upper layer. The QoS request extractor 406 extracts a QoS request from the data received by the receiver 402. The QoS request extractor 406 transmits the extracted QoS request to the schedule generator 408. Note that, as illustrated in FIG. 4B, a QoS request transmitted from the wireless station (STA) includes each of the fields "Present MCS", "Minimum MCS", and "Maximum MCS". In the case of millimeter-wave communication based on IEEE Std 802.11ad, the range of available MCS indexes is shared by the PCP and each wireless station (STA).

The schedule generator 408 generates a schedule by performing scheduling on all QoS requests of traffic streams, which are transmitted from the QoS request extractor 406. A detailed process for scheduling performed by the schedule generator 408 will be described later. The transmission data processor 410 performs a process for packaging transmission data other than a schedule in accordance with a specified frame format. The transmitter 412 transmits control data including a schedule, and a traffic stream. The transmitter 412 broadcasts the control data including a schedule to all wireless stations (STA) using a beacon frame.

Figure 6:
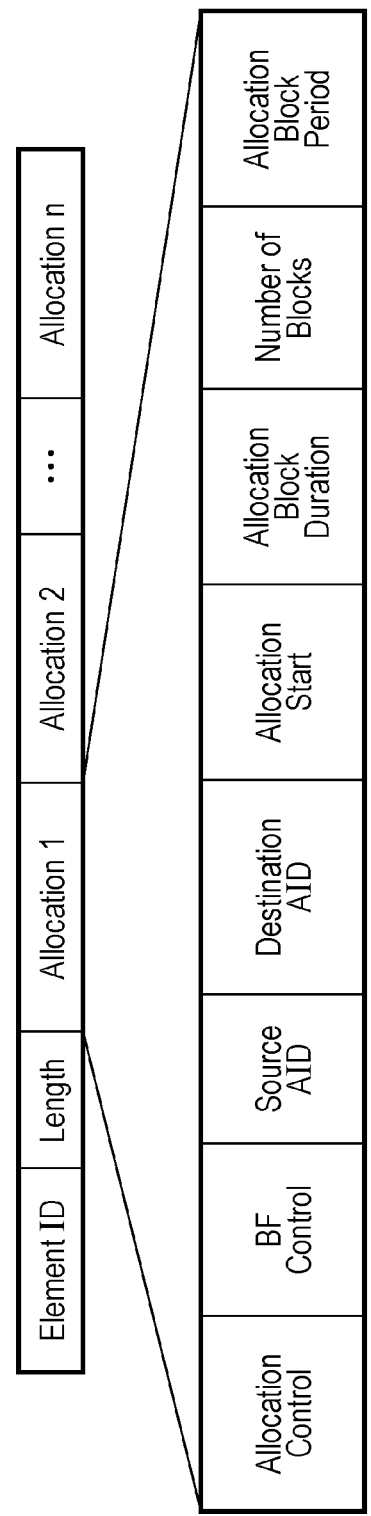
FIG. 6 is a diagram illustrating fields related to an Extended Schedule element in a beacon frame broadcast from a transmitter 412 of the PCP.
Figure 7:
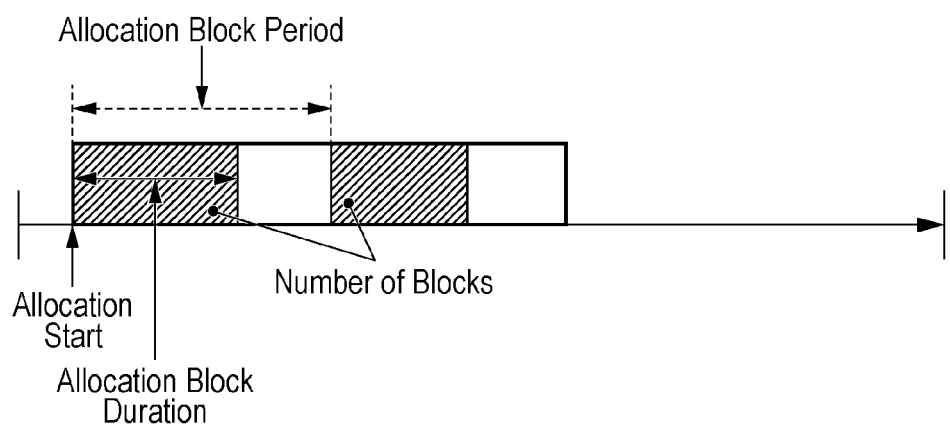

FIG. 6 is a diagram illustrating fields associated with an Extended Schedule element in a beacon frame broadcast from the transmitter 412 of the PCP. In the case of millimeter-wave communications based on IEEE Std 802.11ad, an Extended Schedule element of a beacon frame may be used as a data format in which a schedule is described. FIG. 6 illustrates fields associated with an Extended Schedule element. Among the fields illustrated in FIG. 6, "Allocation 1 to Allocation n" represent bandwidth statuses allocated to n respective QoS requests. Fields associated with a bandwidth and included in each Allocation are four fields: "Allocation Start", "Allocation Block Duration", "Number of Blocks", and "Allocation Block Period". FIG. 7 illustrates meaning of these four fields. "Allocation Start" refers to a start time at which a bandwidth is allocated. "Allocation Block Duration" refers to the width of a block that is a constituent of the allocated bandwidth. "Number of Blocks" refers to the number of blocks in a beacon period. "Allocation Block Period" refers to a block repetition period. Basically, bandwidth allocation is updated every beacon period.

Figure 8:
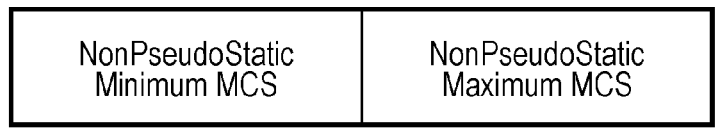
FIG. 8 is a diagram illustrating two fields used to expand an Extended Schedule element, which are an estimated minimum value (NonPseudoStatic Minimum MCS) and an estimated maximum value (NonPseudoStatic Maximum MCS), the estimated minimum value and the estimated maximum value indicating a range of MCS values.

Note that the above-described Extended Schedule element may be used as it is; however, the Extended Schedule element may also be extended for use. In the case where the Extended Schedule element is extended, two fields, which are an estimated minimum value (NonPseudoStatic Minimum MCS) and an estimated maximum value (NonPseudoStatic Maximum MCS), are added to the Extended Schedule element illustrated in FIG. 6, the estimated minimum value and the estimated maximum value indicating the range of MCS indexes with which a schedule may be promptly changed without a delay. FIG. 8 is a diagram illustrating the two fields, which are the estimated minimum value (NonPseudoStatic Minimum MCS) and the estimated maximum value (NonPseudoStatic Maximum MCS), the estimated minimum value and the estimated maximum value indicating the range of MCS indexes which are used to extend the Extended Schedule element.

In the following, a process for scheduling to be performed by the schedule generator 408 will be specifically described. In the following description, the case will be described where the receiver 402 receives two QoS requests and the schedule generator 408 performs scheduling for the two QoS requests. Note that scheduling of transmission time periods dedicated to traffic streams that respective wireless stations (STA) desire to transmit is also called "bandwidth allocation". Thus, for each traffic stream, a transmission time period allocated to the traffic stream is also called "bandwidth".

In addition, in scheduling of the present embodiment, "Allocation Period" and "Minimum Allocation" associated with a band request are used, which are included in the data format in which the QoS request illustrated in FIG. 4A is described. The other two fields associated with the band request, which are "Minimum Duration" and "Maximum Allocation", are not particularly restricted. In the following description, "Allocation Period" is called "period request" and "Minimum Allocation" is called "bandwidth request".

(Step 1: Derivation of QoS Corresponding to Each MCS)

When the receiver 402 of the PCP receives QoS requests from respective wireless stations (STA), each QoS request including the current MCS index and the range of MCS indexes that may be used, the schedule generator 408 derives, for each MCS index included in the received QoS request, QoS corresponding to the MCS index. For example, when the receiver 402 receives a QoS request corresponding to the current MCS index=6 from a wireless station (STA), the schedule generator 408 derives, for each MCS index in MCS index=Minimum MCS to Maximum MCS (for example, MCS index=3 to 9), QoS corresponding to the MCS index.

A period request (Allocation Period) corresponding to the current MCS index is denoted by Pc, and a bandwidth request (Minimum Allocation) corresponding to the current MCS index is denoted by Tc. Then, a period request corresponding to another MCS index is denoted by Pi, and a bandwidth request corresponding to another MCS index is denoted by Ti. In this case, the period request Pi and the bandwidth request Ti have relationships expressed by the following Expression (1) and Expression (2). Note that i=1 to n, which is an integer, Pi denotes a period request corresponding to the i-th MCS index, and Ti denotes a bandwidth request corresponding to the i-th MCS index. In addition, n represents the number of MCSs that include the current MCS value, and is determined from "Minimum MCS" and "Maximum MCS" illustrated in of FIG. 4B, "Minimum MCS" referring to the estimated minimum value of MCS indexes, "Maximum MCS" referring to the estimated maximum value of MCS indexes. Expression (1) is based on a restriction on the amount of data, and Expression (2) is based on a restriction on a buffer.

[Math. 1]

$$Ti \times \frac{BI}{Pi} \times Ri = Tc \times \frac{BI}{Pc} \times Rc \qquad (1)$$

$$(Pi - Ti) \times \rho = (Pc - Tc) \times \rho \qquad (2)$$

In Expressions (1) and (2) described above, BI denotes a beacon period and ρ denotes a transmission-data input speed. Note that a beacon period BI and a transmission-data input speed ρ do not affect calculation of a period request Pi and a bandwidth request Ti even though the value of each of the beacon period BI and the transmission-data input speed ρ is unknown. Rc denotes a transmission speed corresponding to the current MCS index, and Ri denotes a transmission speed corresponding to MCS index=i. Note that the transmission speed corresponding to each MCS index is determined by standards, as illustrated in FIG. 3.

For each QoS request received by the receiver 402, the schedule generator 408 executes derivation of QoS, which has been described above. When the receiver 402 receives two QoS requests, which are a first QoS request (P1, T1) and a second QoS request (P2, T2), the schedule generator 408 derives N1 pairs of QoS (P1$i$, T1$i$) (i=1 to N1) including the first QoS (P1, T1) in accordance with the first QoS request (P1, T1) and N2 pairs of QoS (P2$j$, T2$j$) (j=1 to N2) including the second QoS (P2, T2) in accordance with the second QoS request (P2, T2). N1 is the number of MCSs associated with the first QoS request (P1, T1) and is the number of MCS indexes included in the range of "Minimum MCS", which is the estimated minimum index of the MCS indexes, to "Maximum MCS", which is the estimated maximum index. Thus, the QoS corresponding to "Minimum MCS" may be represented as QoS (P11, T11) and the QoS corresponding to "Maximum MCS" as QoS (P1N1, T1N1). Likewise, N2 is the number of MCSs corresponding to the second QoS request (P2, T2).

(Step 2: Calculation of Bandwidth Allocation Period SI)

A bandwidth allocation period (a service interval) SI has been hitherto calculated using period requests P1 and P2 for QoS requests. In the present embodiment, P1$i$ of a first QoS (P1$i$, T1$i$) (i=1 to N1) and P2$j$ of a second QoS (P2$j$, T2$j$) (j=1 to N2) are used. That is, the schedule generator 408 determines the bandwidth allocation period SI by taking an MCS index into consideration in advance. The bandwidth allocation period SI is obtained from the following Expression (3). As expressed by Expression (3), the schedule generator 408 sets the minimum value of all period requests, as the bandwidth allocation period SI.

[Math. 2]

$$SI = \min(P1i, P2j), i=1\sim N1, j=1\sim N2 \qquad (3)$$

(Step 3: Calculation of Transmission Time Period TXOP and Interval M)

Transmission time periods (service time periods) TXOP to be allocated to traffic streams corresponding to respective QoS requests are calculated from the following Expression (4) and (5) based on period requests and bandwidth requests included in the QoS requests as well as the bandwidth allocation period SI.

[Math. 3]

$$TXOP1 = \frac{T1}{P1} SI \qquad (4)$$

$$TXOP2 = \frac{T2}{P2} SI \qquad (5)$$

Figure 9:
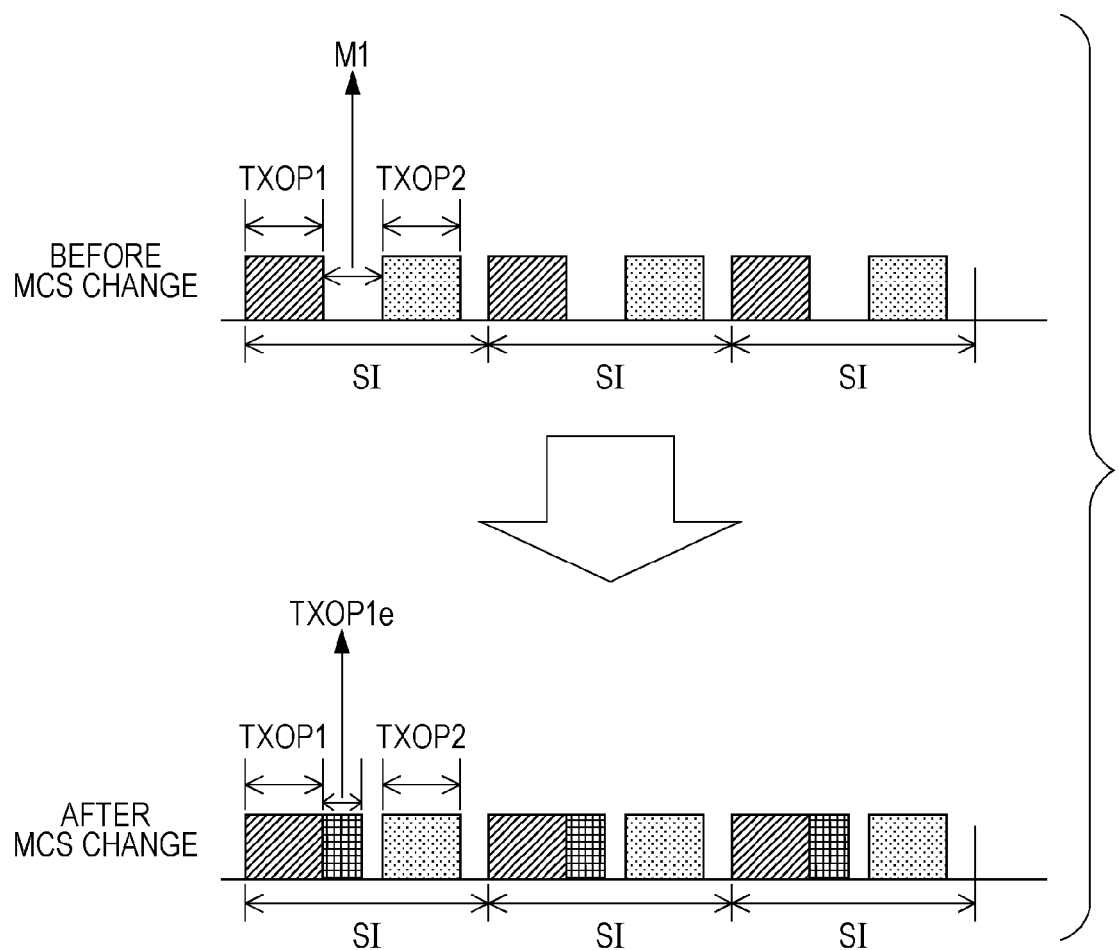
FIG. 9 is a diagram illustrating an example of a schedule obtained by taking an MCS change into consideration in advance and an example of a schedule obtained in the case where, after an MCS change, a transmission time period has been extended (TXOP1→TXOP1+TXOP1e).

As illustrated in FIG. 13A, hitherto, a transmission time period TXOP1 and a transmission time period TXOP2 have been next to each other in the direction of time. However, in the present embodiment, an interval M1 is set between the transmission time period TXOP1 and the transmission time period TXOP2 that are next to each other, by taking extension of a transmission time period because of an MCS change and illustrated in FIG. 9 into consideration in advance. By providing the interval M1, the service time period TXOP1 may be extended without a delay. That is, in the case where a longer transmission time period is needed because of a change in a communication status, a transmission time period may be extended without a delay. FIG. 9 is a diagram illustrating an example of a schedule obtained by taking an MCS change into consideration in advance and an example of a schedule obtained in the case where, after an MCS change, a transmission time period has been extended (TXOP1→TXOP1+TXOP1$e$).

The interval M1 is calculated from the difference between a maximum value TXOP1max of transmission time periods and the transmission time period TXOP1 calculated above. As expressed by the following Expression (6), calculation is performed from the difference between the maximum value TXOP1max of transmission time periods and the transmission time period TXOP1 calculated above.

[Math. 4]

$$M1 = TXOP1\max - TXOP1 \qquad (6)$$

Note that "TXOP1max" of Expression (6) is obtained from the following Expression (7).

[Math. 5]

$$TXOP1\max = \max\left(\frac{T1i}{P1i} SI\right), \qquad (7)$$
$$i = 1 \sim NI$$

Note that the interval M1 may be used for extending the transmission time period TXOP1 and also for extending the transmission time period TXOP2.

(Step 4: Determination of No-Delay MCS-Value Range Based on Pseudo-Static Bandwidth Technology)

In the above description, bandwidths to be allocated to two respective traffic streams are calculated by performing Steps 1 to 3. Furthermore, it is necessary to determine whether the bandwidths calculated as in the above description may be actually ensured. For such a determination, for example, the following Expression (8) may be used. Note that β expressed on the right side of Expression (8) is a positive number less than or equal to 1 (for example, 0.8) and is a coefficient obtained through an experiment.

[Math. 6]

$$TXOP1 + TXOP2 + M1 \leq \beta \cdot SI \quad (8)$$

In the case where Expression (8) is not satisfied, the schedule generator 408 performs recalculation for bandwidth allocation. Specifically, the range of available MCS values is reduced from the original range, which is Minimum MCS to Maximum MCS, and the schedule generator 408 performs calculation again from the above-described Step 1. Usually, as the estimated maximum index (Maximum MCS) of MCS indexes is decreased, the bandwidth allocation period SI, which is necessary, increases. In contrast, as the estimated minimum index (Minimum MCS) of MCS indexes is increased, TXOPmax and the interval M1, which are necessary, decrease. In either case, it becomes easier to ensure allocation of a bandwidth, and a schedule may be changed without a delay.

The schedule generator 408 determines finally the range of MCS indexes by performing the above-described Steps 1 to 4. Then, a schedule is created in which the finally determined range of MCS indexes (the estimated minimum index to the estimated maximum index) is set as "NonPseudoStatic Minimum MCS to NonPseudoStatic Maximum MCS". NonPseudoStatic Minimum MCS represents the estimated minimum index of MCS indexes with which a delay does not occur due to the Pseudo-Static bandwidth technology in the case where a schedule is changed, and NonPseudoStatic Maximum MCS represents likewise the estimated maximum index.

Figure 10:
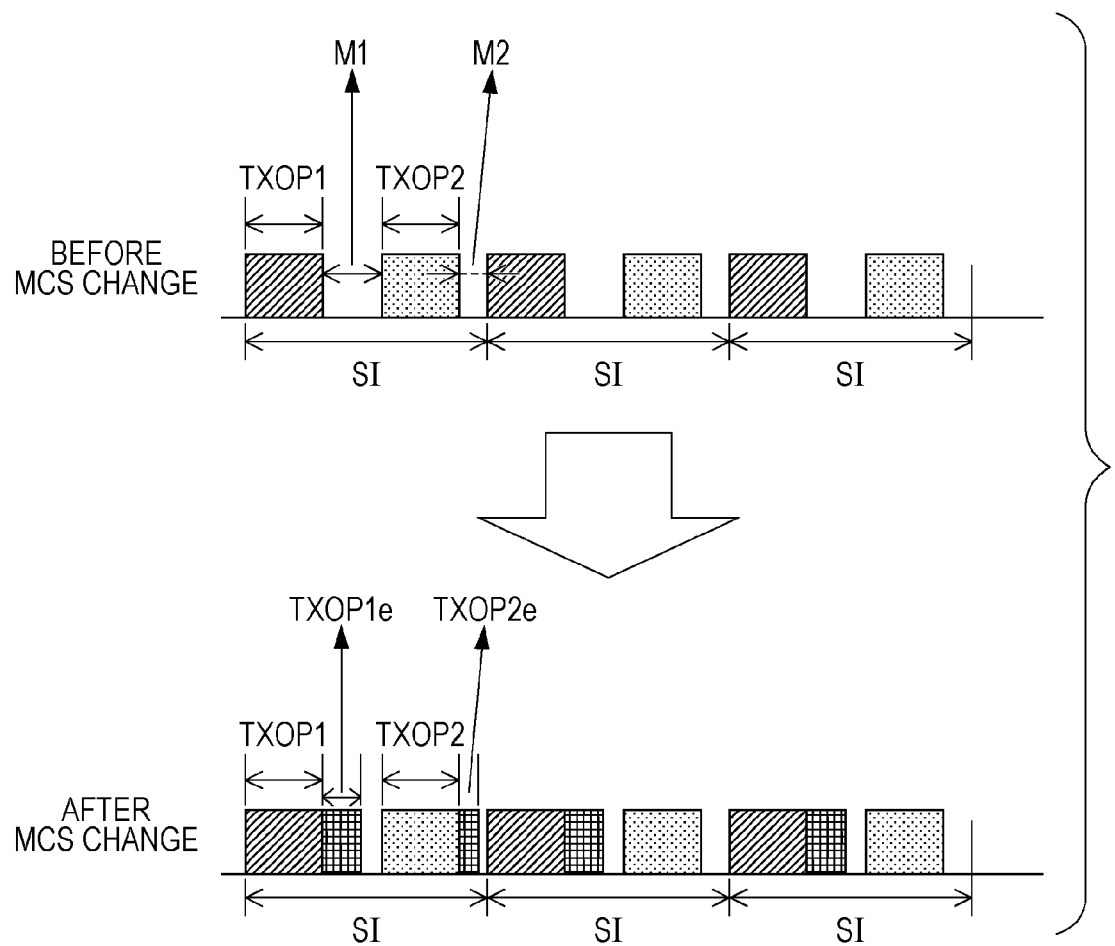
FIG. 10 is a diagram illustrating another example of a schedule obtained by taking an MCS change into consideration in advance and another example of a schedule obtained in the case where, after an MCS change, a transmission time period has been extended (TXOP1→TXOP1+TXOP1e, TXOP2→TXOP2+TXOP2e).

In the above-described description, the interval M1 has been set between the transmission time period TXOP1 and the transmission time period TXOP2 that are next to each other, by taking extension of a transmission time period because of an MCS change into consideration in advance. As illustrated in FIG. 10, an interval M2 may also be additionally set on the side of the transmission time period TXOP2 opposite to the side where the interval M1 is provided. FIG. 10 is a diagram illustrating another example of a schedule obtained by taking an MCS change into consideration in advance and another example of a schedule obtained in the case where, after an MCS change, transmission time periods have been extended (TXOP1→TXOP1+TXOP1e, TXOP2→TXOP2+TXOP2e).

As expressed by the following Expression (9), the interval M2 is calculated from the difference between a maximum value TXOP2max of transmission time periods and the transmission time period TXOP2 calculated above.

[Math. 7]

$$M2 = TXOP2\text{max} \cdot TXOP2 \quad (9)$$

Note that "TXOP2max" of Expression (9) is obtained from the following Expression (10).

[Math. 8]

$$TXOP2\text{max} = \max\left(\frac{T2j}{P2j}SI\right), j = 1 \sim N2 \quad (10)$$

In this manner, in the case where the interval M1 and the interval M2 have been set, in Step 4, the following Expression (11) is used as an expression used to determine whether a calculated bandwidth is actually ensured.

[Math. 9]

$$TXOP1 + TXOP2 + M1 + M2 \leq \beta \cdot \quad (1)$$

Note that the interval M set between TXOP1 and TXOP2 may be used for extending the transmission time period TXOP1 and also for extending the transmission time period TXOP2. In this case, a computational expression for the interval M is expressed as the following Expression (12). Note that the interval M1 included in the right side of Expression (12) is a value calculated from the above-described Expression (6), and the interval M2 is a value calculated from Expression (9) described above.

[Math. 10]

$$M = \max(M1, M2) \quad (12)$$

In addition, in the case where the interval M has been set, in Step 4, the following Expression (13) is used as an expression used to determine whether a calculated bandwidth is actually ensured.

[Math. 11]

$$TXOP1 + TXOP2 + \leq \beta \cdot SI \quad (13)$$

Figure 11:
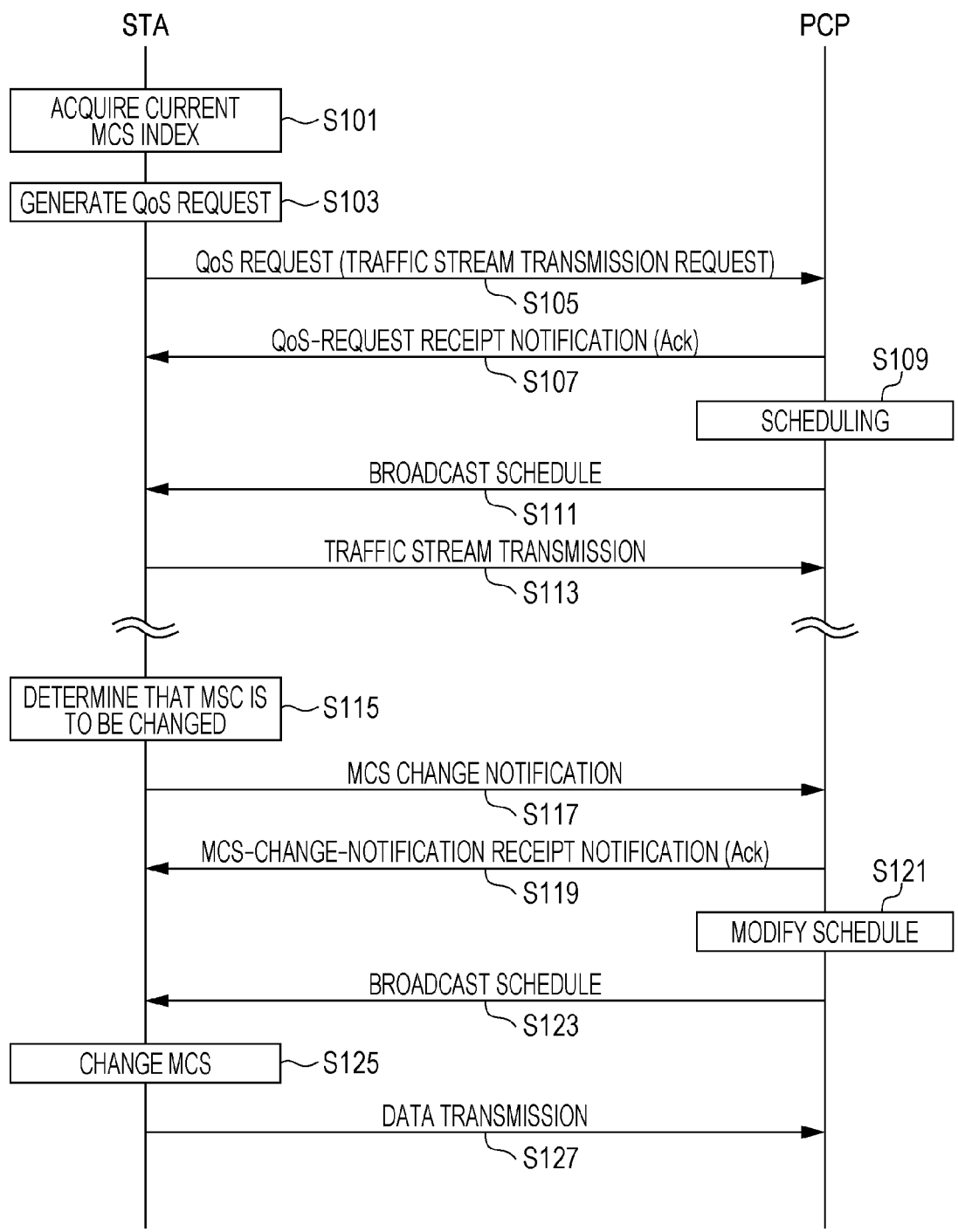
FIG. 11 is a diagram illustrating a sequence illustrating scheduling before and after an MCS change.

In the following, a sequence illustrating scheduling before and after an MCS change will be described with reference to FIG. 11. FIG. 11 is a sequence illustrating scheduling before and after an MCS change. A wireless station (STA) acquires a current MCS index (S101) and generates a QoS request corresponding to data characteristics of a traffic stream desired to be transmitted and the MCS index (S103). Next, the wireless station (STA) transmits the QoS request to a PCP as a transmission request for the traffic stream (S105). After transmitting an acknowledgment (Ack) indicating that the QoS request has been received to the wireless station (STA) (S107), the PCP performs scheduling corresponding to the QoS request (S109). The PCP broadcasts a schedule created by performing scheduling, through a beacon frame (S111). The wireless station (STA) performs traffic stream transmission in accordance with the schedule included in the broadcast beacon frame (S113).

Thereafter, in the case where the wireless station (STA) has determined to change the MCS because of a change in a communication distance or the like between the wireless station (STA) and the PCP (S115), the wireless station (STA) notifies the PCP that the MCS is to be changed, using the data format of a QoS request (S117). That is, the wireless station (STA) transmits, to the PCP, a QoS request corresponding to "Present MCS" illustrated in FIG. 4B and a post-change MCS index. After transmitting an acknowledgment (Ack) indicating that an MCS change notification has been received to the wireless station (STA) (S119), the PCP performs scheduling corresponding to the MCS change notified by the wireless station (STA). That is, the PCP modifies the schedule created previously (S121). Note that, by modifying the schedule, the above-described transmission time period is extended (TXOP1→TXOP1+TXOP1e). The PCP broadcasts the modified schedule, through a beacon frame (S123). The wireless station (STA) changes the MCS (S125) and then performs traffic stream transmission in accordance with the modified schedule included in the broadcast beacon frame (S127).

As described above, in the present embodiment, the interval M1 (M1>=TXOP1e) sufficient for extending the transmission time period is set. Thus, as illustrated in FIG. 9, even in the case where the transmission time period for a traffic stream is needed to extend from "TXOP1" to "TXOP1+TXOP1e" because of an MCS change, a schedule may be promptly changed without being affected by the Pseudo-Static bandwidth technology. In addition, since a traffic stream is not allocated in the interval M1 when a schedule is initially created, a channel utilization ratio is not affected. According to the present embodiment, in a wireless communication system that transmits and receives a traffic stream, a degradation of QoS of communications caused by a schedule change may be prevented.

In the present embodiment, the configuration of the PCP and that of the wireless station (STA) have been separately described; however, the PCP may also have a configuration that has the function of the wireless station (STA). In this case, the PCP may also be used as one wireless station (STA).

In addition, in the present embodiment, a traffic stream for which a dedicated transmission bandwidth is requested has been described as an example; however, use of a contention band (so-called a CBAP (Contention Based Access Period)) is not excluded. That is, when the entire transmission band is divided into a contention band and a non-contention band, the present embodiment relates to allocation of a non-contention band. Note that there are no particular restrictions as to how to perform division into a contention band and a non-contention band. For example, a non-contention band may be allocated in a prioritized manner and the remaining band may be used as a contention band. In addition, a contention band may be set prior to a non-contention band, and the band other than the contention band may also be used as a non-contention band.

Furthermore, in the present embodiment, scheduling is performed in accordance with a QoS request received by the PCP; however, traffic control under which it is determined whether a QoS request is to be received may also be performed by the PCP. That is, after receiving a QoS request, the PCP first determines whether it is possible to allocate a requested bandwidth in accordance with the current bandwidth use status. In the case where it is determined that such allocation is impossible, the PCP rejects the QoS request. How to perform such traffic control is not particularly restricted.

Second Embodiment

In the first embodiment, the wireless station (STA) transmits a QoS request corresponding to the current MCS index to the PCP. When an MCS index is changed, as described as in processing in Step 1 performed by the schedule generator 408, the PCP derives, for each MCS index other than the current MCS index, QoS corresponding to the MCS index. In contrast, in a second embodiment, the wireless station (STA) performs the processing in Step 1 and the PCP acquires a result of the processing performed by the wireless station (STA). Thus, in the present embodiment, the data format in which a QoS request is described differs from that described in the first embodiment and illustrated in FIGS. 4A and 4B. Note that points other than this point are the same as those of the first embodiment. In addition, the wireless station (STA) may also store, in a memory, the above-described result of the processing in Step 1 in a form such as a table or the like.

Figure 12:
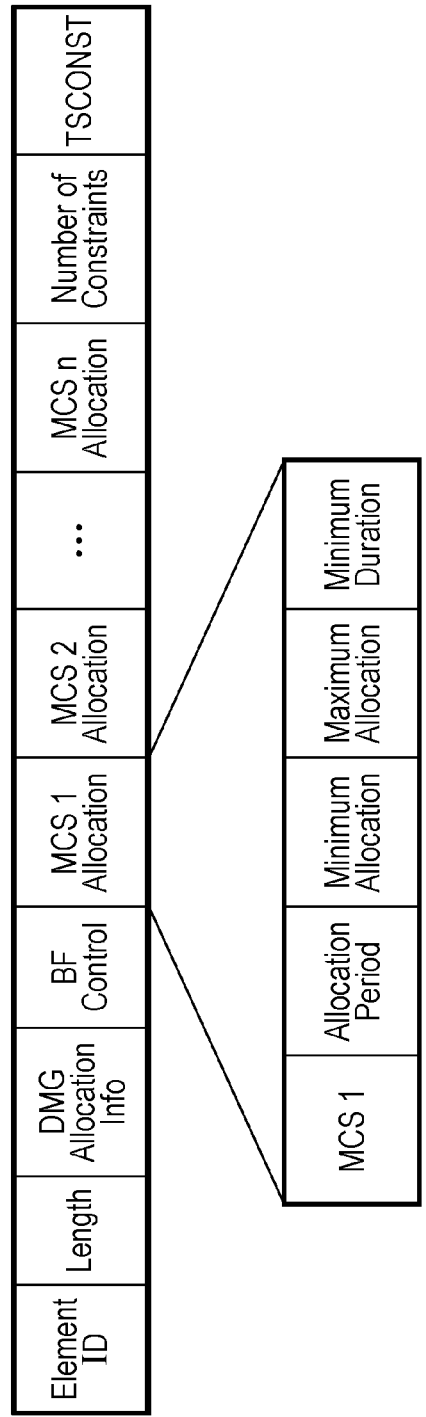
FIG. 12 is a diagram illustrating a data format in which a QoS request of the second embodiment is described.

FIG. 12 is a diagram illustrating a data format in which a QoS request of the second embodiment is described. As illustrated in FIG. 12, the data format includes n fields denoted by MCS 1 Allocation to MCS n Allocation. In each field, an MCS index and the QoS corresponding to the MCS index are described. For example, the field "MCS 1 Allocation" includes an MCS index denoted by MCS 1 and "Allocation Period", "Minimum Allocation", "Maximum Allocation", and "Minimum Duration" corresponding to the MCS index.

According to the present embodiment, a degradation of QoS of communications caused by a schedule change may be prevented in a wireless communication system that transmits and receives traffic streams. Furthermore, when compared with the first embodiment, although the amount of control data in communication is increased, the PCP of the second embodiment is able to determine a QoS request made by a wireless station (STA) more accurately. Thus, for example, in the case where a wireless station (STA) has a specific overhead request or the like for transmission using different MCSs, it is considered that the second embodiment has better performance.

INDUSTRIAL APPLICABILITY

A wireless communication device according to the present disclosure is a millimeter-wave communication device, provides a method and a device that may realize changing of a transmission schedule without a delay, and may prevent a reduction in the quality of communication caused by a change in a communication environment. In particular, such a wireless communication device is effective as a millimeter-wave communication device that may be applied to an application having a real-time requirement such as video streaming and that may ensure seamless playback.

REFERENCE SIGNS LIST 202 transmission data processor
204 transmitter
206 QoS request generator
210 transmission quality monitor
208 MCS determiner
214 receiver
212 transmission schedule controller
216 reception data processor
402 receiver
404 reception data processor
406 QoS request extractor
408 schedule generator
410 transmission data processor
412 transmitter

The invention claimed is:
1. A wireless communication device comprising:
a receiver, which, in operation, receives QoS requests, each of the QoS requests including a current MCS index and a range of available MCS indexes, from a wireless station;
schedule generating circuitry, which, in operation and in accordance with the QoS requests received by the receiver, sets a period for periodically allocating respective transmission time periods of a plurality of traffic streams, provides an interval between transmission time periods that are next to each other in each period, and generates a schedule for the wireless station to transmit the plurality of traffic streams; and a transmitter, which, in operation, transmits the schedule generated by the schedule generating circuitry to the wireless station using a broadcast frame, wherein the schedule generating circuitry, in operation, generates the schedule for transmitting the plurality of traffic streams, in accordance with a QoS request including a changed MCS index, to change a current MCS index included in a QoS request transmitted from the wireless station.

2. A wireless communication device in a wireless communication system that transmits and receives a traffic stream using a millimeter wave, the wireless communication device comprising:

a receiver, which, in operation, receives QoS requests respectively transmitted by wireless stations, each of the QoS requests including a current MCS index and a range of available MCS indexes of a corresponding one of the wireless stations;

schedule generating circuitry which, in operation and in accordance with the QoS requests received by the receiver, sets a period for periodically allocating respective transmission time periods of a plurality of traffic streams that are to be transmitted by at least one wireless station that communicates with the wireless communication device, provides an interval between transmission time periods that are next to each other in each period, and generates a schedule for the at least one wireless station to transmit the plurality of traffic streams; and a transmitter, which, in operation, transmits the schedule generated by the schedule generating circuitry to the at least one wireless station using a broadcast frame, wherein the schedule generating circuitry, in operation, generates the schedule for transmitting the plurality of traffic streams, in accordance with a QoS request including a changed MCS index, to change a current MCS index included in a QoS request transmitted from the at least one wireless station.

3. The wireless communication device according to claim 2, wherein the schedule generating circuitry, in operation, sets, as the period, a minimum value among a period request corresponding to the current MCS index included in each of the QoS requests and period requests indicated by QoSs respectively corresponding to MCS indexes within the range of available MCS indexes included in each of the QoS request.

4. The wireless communication device according to claim 2, wherein the schedule generating circuitry, in operation, calculates transmission time periods to be respectively allocated to the plurality of traffic streams in accordance with QoS and the period, the QoS corresponding to the current MCS index included in one of the QoS requests, and then sets, as the interval, a difference between a maximum value of the transmission time periods for the range of available MCS indexes and corresponding one of the calculated transmission time periods.

5. The wireless communication device according to claim 2, wherein the schedule generating circuitry, in operation, derives QoS corresponding to each MCS index in accordance with QoS and a transmission speed corresponding to the current MCS index included in the QoS requests as well as transmission speeds respectively corresponding to MCS indexes within the range of available MCS indexes included in each of the QoS requests.

6. The wireless communication device according to claim 2, wherein the wireless station:

derives QoS corresponding to each MCS index in accordance with QoS and a transmission speed corresponding to the current MCS index included in the QoS requests as well as a transmission speeds respectively corresponding to MCS indexes within the range of available MCS indexes included in each of the QoS requests, and includes, in the QoS request, the derived QoS corresponding to each MCS index and the QoS corresponding to the current MCS index.

7. A wireless communication system which, in operation, transmits and receives a traffic stream using a millimeter wave, comprising:

at least one wireless station, which, in operation, transmits a traffic stream and a QoS request including a current MCS index and a range of available MCS indexes for transmitting the traffic stream; and a wireless communication device, which, in operation, performs scheduling for the at least one wireless station to transmit the traffic stream, wherein the wireless communication device includes:

schedule generating circuitry, which, in operation, generates a schedule for the at least one wireless station to transmit a plurality of traffic streams, a transmitter, which, in operation, transmits the schedule generated by the schedule generating circuitry to the at least one wireless station using a broadcast frame, and a receiver, which, in operation, receives traffic streams and QoS requests transmitted by the at least one wireless station, wherein the schedule generation circuitry, in operation and in accordance with the QoS requests received by the receiver, sets a period for periodically allocating respective transmission time periods of the plurality of traffic streams, provides an interval between transmission time periods that are next to each other in each period, and generates the schedule for the at least one wireless station to transmit the plurality of traffic streams, wherein the schedule generating circuitry, in operation, generates the schedule for transmitting the plurality of traffic streams, in accordance with a QoS request including a changed MCS index, to change a current MCS index included in a QoS request transmitted from the at least one wireless station.

8. A wireless communication method for a wireless communication system including at least one wireless station that transmits, using a millimeter wave, a traffic stream and a QoS request including a current MCS index and a range of available MCS indexes for transmitting the traffic stream, and a wireless communication device that performs scheduling for the wireless station to transmit the traffic stream, the wireless communication method being to be performed by the wireless communication device, the wireless communication method comprising:

receiving QoS requests respectively transmitted by wireless stations, each of the QoS requests including a current MCS index and a range of available MCS indexes for transmitting a traffic stream;

setting, in accordance with the QoS requests received in the receiving step, a period for periodically allocating respective transmission time periods of a plurality of traffic streams that are to be transmitted by the at least one wireless station, providing an interval between transmission time periods that are next to each other in each period, and generating a schedule for the at least one wireless station to transmit the plurality of traffic streams; and transmitting the schedule generated in the schedule generating step to the at least one wireless station using a broadcast frame, wherein the schedule is generated, in accordance with a QoS request including a changed MCS index, to change a current MCS index included in a QoS request transmitted from the at least one wireless station.

* * * * *